United States Patent [19]

Iceland et al.

[11] 4,273,988
[45] Jun. 16, 1981

[54] PULSE WELDING PROCESS

[75] Inventors: William F. Iceland, Los Alamitos; Donald P. Viri, Simi Valley, both of Calif.

[73] Assignee: Rockwell International Corporation, El Segundo, Calif.

[21] Appl. No.: 69,028

[22] Filed: Aug. 23, 1979

[51] Int. Cl.³ .............................................. B23K 9/09
[52] U.S. Cl. ......................... 219/137 PS; 219/130.51
[58] Field of Search ..................... 219/130.51, 137 PS, 219/125.12

[56] References Cited

U.S. PATENT DOCUMENTS

| | | | |
|---|---|---|---|
| 3,249,735 | 5/1966 | Needham | 219/130.51 |
| 3,528,100 | 9/1970 | Budy | 219/130.51 |
| 3,781,511 | 12/1973 | Rygiol | 219/137 PS |
| 3,818,176 | 6/1974 | Brown | 219/125.12 |
| 3,956,610 | 5/1976 | Kanbe et al. | 219/137 PS |
| 4,019,016 | 4/1977 | Friedman et al. | 219/130.51 |

OTHER PUBLICATIONS

F. Rienks et al., "Development and Evaluation of a Modulated Power Control for Fusion Welding" *Welding Research Supplement*, pp. 222-S–230-S, 5/1971.

Primary Examiner—C. C. Shaw
Attorney, Agent, or Firm—Clark E. DeLarvin; Henry Kolin

[57] ABSTRACT

A gas-shielded, metal-arc, pulse welding process which comprises establishing an arc with a consumable metal electrode in a gas-shielded environment. A direct current in the range of from about 15 to 80 amps is applied to the electrode and pulsated at a frequency of from about 5000 to 25,000 pulses per second to a first maximum amplitude of from 100 to 125% of the minimum current required to produce a spray transfer of metal from the electrode. The pulsating current applied to the electrode is cyclically increased at a frequency of from about 90 to 400 cycles per second to a second maximum amplitude of from about 150 to 600% of the minimum current required to produce a spray transfer of metal from the electrode and is maintained at the second maximum amplitude for a time within the range of from 5 to 50% of each cycle. The process is particularly applicable to automatic welding processes wherein the weld must be accomplished out-of-position. In accordance with the present invention, the deposition rate is greatly enhanced in such a process without any detrimental effect on the quality of the weld.

11 Claims, 3 Drawing Figures

PULSE WELDING PROCESS

The present invention relates to an arc-welding process utilizing a consumable metal electrode in a gas-shielded environment. The invention particularly relates to an arc-welding process in which the current supplied to the arc is pulsed at both high and low frequencies.

In arc welding, an arc is established between a work member and a consumable or nonconsumable electrode. In consumable electrode arc-welding processes, an electrode of indefinite length is continuously fed to the welding arc where it is melted by the intense heat of the arc and fuses with a work member. Generally, the metal deposited from the consumable electrode is shielded either with a flux or a shielding gas, the latter generally being referred to as gas metal arc welding. This process was developed about 1948 and initially was applied to the welding of aluminum. It was found to be substantially faster than the previously utilized nonconsumable electrode welding processes. It later was adapted to the welding of carbon and stainless steels when it was found that a small percentage of oxygen added to the inert shielding gas (argon) provided substantially improved arc action and welding characteristics without any adverse effect on the weld metal properties. Since that time, gas metal-arc welding has gained rapid acceptance for welding many kinds of metal in numerous types of industries.

A principal advantage of gas metal arc welding is the high rate at which metal may be deposited. It is reported that the metal transfer rate may range as high as 800 inches per minute of 0.035 inch diameter electrode wire. A disadvantage of the gas metal arc welding process, however, was that it was not readily amenable to out-of-position welding, that is, welding not accomplished substantially in a vertically down position on a surface which is within about 10 degrees of flat or horizontal.

Various attempts have been made to adapt gas metal arc welding to out-of-position welding. The most common approach has been to weld at relatively low current such that the metal transfer is in a droplet mode rather than the conventional spray mode utilized for down hand welding. For example, in a spray transfer process using a 1/16th inch diameter commercially pure aluminum electrode fed at 200 inches per minute and with argon gas shielding, metal is transferred from the electrode to the workpiece in a spray of fine droplets at a rate of about 200 drops per second. At lower current densitities, however, the transfer is more in the form of large drops or globules. The globules frequently are larger than the diameter of the electrode and are transferred at a much lower rate, for example, at a rate of about 5 drops per second. This type of process, sometimes referred to as short circuit welding, was believed necessary for out-of-position welding to permit the transferred metal to cool and solidify. The disadvantage of this type of transfer, however, is that less penetration is obtained and the transfer tends to be erratic. Thus, numerous attempts have been made to adapt gas metal arc welding to out-of-position welding but without the necessity of the globular type transfer.

U.S. Pat. No. 3,528,100 discloses an arc establishing circuit and method which is particularly adapted to the formation of a highly stable and continuous welding arc with intermittant transfer of welding metal from a consumable electrode. In accordance with the invention disclosed therein, a dual voltage power supply is connected across the consumable electrode and the work. A switching means is interconnected with the power supply to selectively connect a high voltage supply and a low voltage supply across the electrode and the work, with adjustable means to control the turn-on and turn-off of the high voltage supply. The high voltage supply is sufficient to initially establish and maintain the arc with substantial metal transfer from the consumable electrode. When the high voltage supply is removed, the low voltage supply maintains the previously established arc but with minimal metal transfer. During this latter period, the weld metal is allowed to cool to prevent run-offs.

Patentee broadly teaches pulsing from 60 to 90 pulses per second and discloses that for relatively thin material and out-of-position welding a relatively low pulse rate and short pulse time may be more advantageously employed. For heavier work and in-position, a substantially greater pulse rate and on-time are taught. Patentee further teaches that if the pulse rate is above 100 pulses per second, metal transfer from the electrode is essentially a continuous spray-type transfer such that the pulse control is completely ineffective.

U.S. Pat. No. 3,818,176 discloses an apparatus for a pulse welding process in which the arc is cyclically oscillated across and/or along the weld joint line during a weld, and in which the phase of the cyclic oscillations is correlated with the phase of periodic metal transfer from the electrode to the workpiece such that each transference of metal takes place at a preselected instant during the cyclic movement of the arc. It is suggested that in this manner the heat and metal transfer along the weld joint line could be programmed to provide heat and metal where it is most needed. Patentee suggests that his apparatus and process are applicable to a process wherein a pulsating current (about 50 pulses per second) is fed to the arcing electrode, and to dip or short circuit transfer process wherein metal transfer from the electrode to the workpiece occurs at a short circuiting frequency of between about 25 and 100 pulses per second.

More recently, in U.S. Pat. No. 3,956,610, there is disclosed another welding process utilizing a pulsating arc. It is said to be applicable to out-of-position welding. In accordance with the process disclosed therein, an arc is established with a metal electrode and a first value of current is supplied to the arc and thereafter a second value of current applied to the arc. The current is changed back and forth between the first and second values every 0.3 to 3 seconds. The first value of current is just sufficient to maintain the arc and substantially avoid transfer of metal beyond a trace through the arc. While the second value is substantially larger than the first value, it is sufficient for producing a spray transfer of metal.

The arc and metal electrode are moved generally along a path, and the arc and electrode are weaved transverse to the path. The speed of movement of the electrode in the path is changed synchronously with the changes in current values while the initiating and halting of the weaving of the electrode is in synchronism with the periodic change of the welding current. Patentees further suggest the stability of the arc can be improved if necessary by superimposing a high frequency electric current. Patentees specifically suggest alternating currents of, for instance, several hundred kilohertz and several thousand volts for arc stabilization.

In spite of the many improvements made and suggested, the deposition rate for out-of-position welding with gas metal-arc welding remains relatively low, namely less than about 3 pounds per hour. Clearly, therefore, there still is need for an improvement in gas metal-arc welding processes to permit welding at higher deposition rates without adversely affecting the quality of the weld.

The present invention provides a gas metal-arc welding process which is particularly applicable to out-of-position welding and permits welding at higher deposition rates than were heretofore possible while still obtaining a high quality weld. The process of the present invention comprises establishing an arc with a consumable metal electrode in a gas shielded environment, a direct current in the range of from about 15 to 80 amps is applied to the arc and pulsed at a frequency of from about 5000 to 25,000 pulses per second to a first maximum amplitude of from 100 to 125% of the minimum current required to produce a spray transfer of metal from the electrode. The pulsating current applied to the electrode is cyclically increased at a frequency of from about 90 to 400 cycles per second to a second maximum amplitude of from about 150 to 600% of the minimum current required to produce a spray transfer of metal from the electrode and is maintained at this second maximum amplitude for a time within the range of from about 5 to 50% of each cycle.

In accordance with a preferred embodiment of the invention, the shielding gas comprises a three-part mixture of argon, helium and $CO_2$, with a mixture comprising 61% helium, 35% argon and about 4% $CO_2$ being particularly preferred. In accordance with yet another embodiment, the consumable metal electrode includes a flux which may be introduced peripherally about the outer surface of the electrode or contained in a central core. In still another embodiment of the invention, the welding process is accomplished automatically.

The invention is particularly applicable to automatic welding processes wherein there are provided means for automatically feeding the electrode into the arc at a controllable rate and moving the electrode in a linear direction while simultaneously oscillating the electrode and arc linearly and laterally of said linear movement. In such embodiment, it has been found that increasing the voltage across the arc at a predetermined point in the lateral movement of the arc greatly enhances the quality of the weld produced. Specifically, by increasing the voltage across the arc at the extreme ends of the lateral movement, deeper penetration is obtained into the workpiece being welded such that fusion between the metal electrode material being deposited and the work is reliably obtained. Oscillating the arc linearly in the direction of welding also further enhances the weld deposition rate.

Other embodiments and advantages of the present invention will become more fully apparent upon consideration of the description of exemplary embodiments thereof considered in connection with the accompanying drawings in which a preferred embodiment of the invention is illustrated by way of example. It is to be understood, however, that the drawings are for the purpose of illustration and description only and are not intended as a definition of the limits of the invention.

Figure 1:
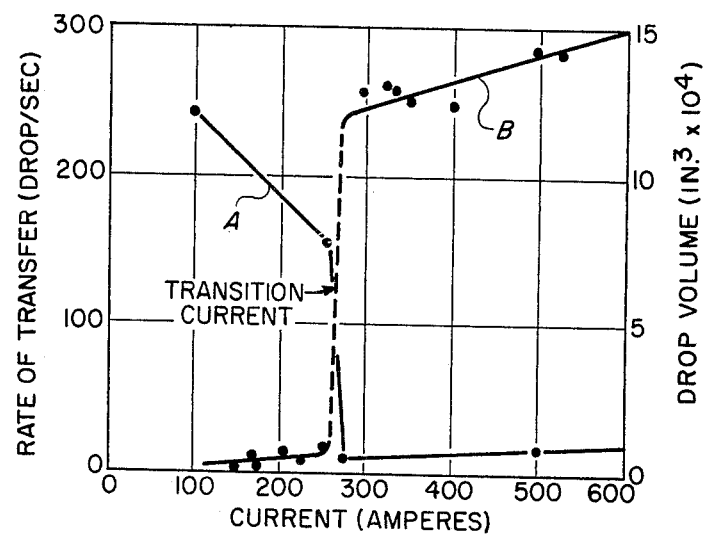
FIG. 1 is a graph showing a typical relationship of weld current to droplet transfer rate and drop size.

In accordance with the present invention, there is provided a gas metal-arc welding process which makes it possible to obtain high quality welds at higher deposition rates than were heretofore possible. The process comprises applying a sufficient voltage between the electrode and work to establish an arc in a gas shielded environment and continually transferring metal in a spray transfer mode of operation. Referring to FIG. 1, therein is depicted a graph showing the typical relationship between amperage and droplet transfer rate, and drop size for a 1/16th inch diameter steel wire electrode shielded with argon gas.

As seen from the graph, a gradual increase in current causes an increase in the melting rate of the electrode and at the same time produces increase in the rate at which drops are detached from the electrode (Curve B). The increase in current also results in a reduction in the drop size (Curve A). At first, the change in drop size and frequency of transfer are gradual and uniform. This gradual change in drop size and frequency of transfer does not, however, continue indefinitely. When the welding current is increased beyond a critical level, the drop size is reduced very suddenly and the frequency of release from the electrode increases markedly.

The curves in FIG. 1 illustrate the suddenness of these changes. Thus, it is seen that an increase in current of from about 255 to 265 amperes causes the drop frequency to change suddenly from 15 drops per second to 240 drops per second, while the drop diameter is reduced from about 0.16 to about 0.04 inches. The median current at which this discontinuity occurs is called the transition current. For the example given, it is at about 260 amperes. As those versed in the art will appreciate, welding at currents below the transition current frequently is referred to as a "drop transfer" or "short circuit" mode of operation, whereas welding at a current in excess of the transition current is referred to as a spray transfer mode of operation.

It also will be appreciated that a sharp change in the mode of metal transfer achieved by increasing the current through the transition point is not accompanied by any sudden change in the electrode melting rate. It does change, of course, but only by the amount expected as a result of the same increase of current without a change in the mode of transfer. More particularly, the abrupt decrease in the size of drops is offset by the abrupt increase in the rate of droplet transfer. This same transition phenomena occurs with all metals but at different levels of current. Thus, the transition point or minimum current required for a spray transfer mode of operation is readily determinable for any given material, electrode size, shielding gas and the like. It is a particular feature of the present invention that the welding is accomplished continuously in the spray transfer mode of operation.

Figure 2:
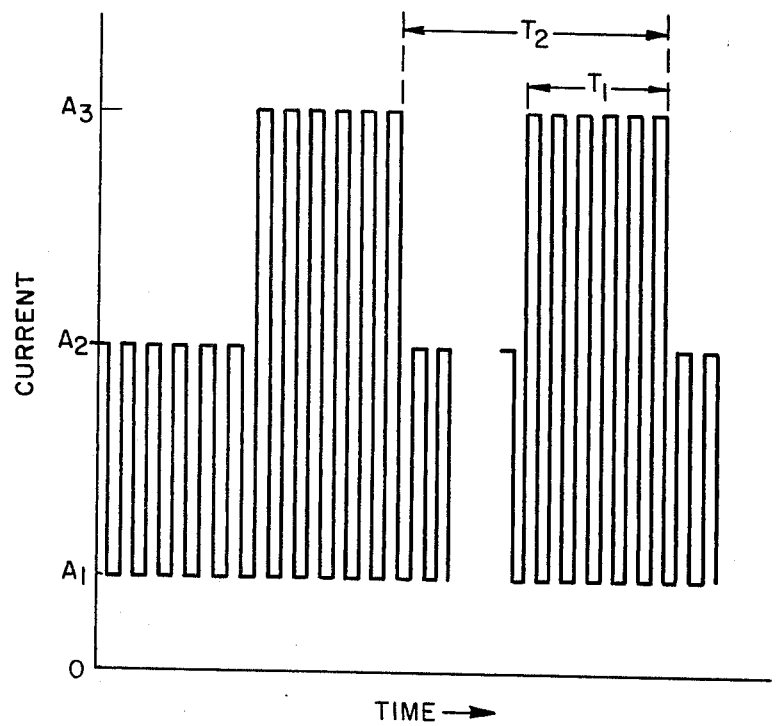
FIG. 2 is a graph of a welding current wave form versus time in accordance with the invention.

Referring now to FIG. 2, therein is depicted an exemplary welding wave form in accordance with the present invention. A direct current having a value of $A_1$ is applied to the arc and pulsed to a first maximum amplitude $A_2$ at a frequency of from about 5000 to 25,000 pulses per second. The first maximum amplitude $A_2$ is from 100 to about 125% of the minimum current required to produce a spray transfer of metal from the electrode. This pulsating current applied to the electrode is cyclically increased at a frequency of from about 90 to 400 cycles per second to a second maximum amplitude $A_3$. The second maximum amplitude $A_3$ has a value of from about 150 to 600% of the minimum current required to produce a spray transfer of metal from the electrode. The current $A_3$ is maintained at this second maximum amplitude for a time $T_1$ which is within the range of from about 5 to 50% of each cycle $T_2$.

Figure 3:
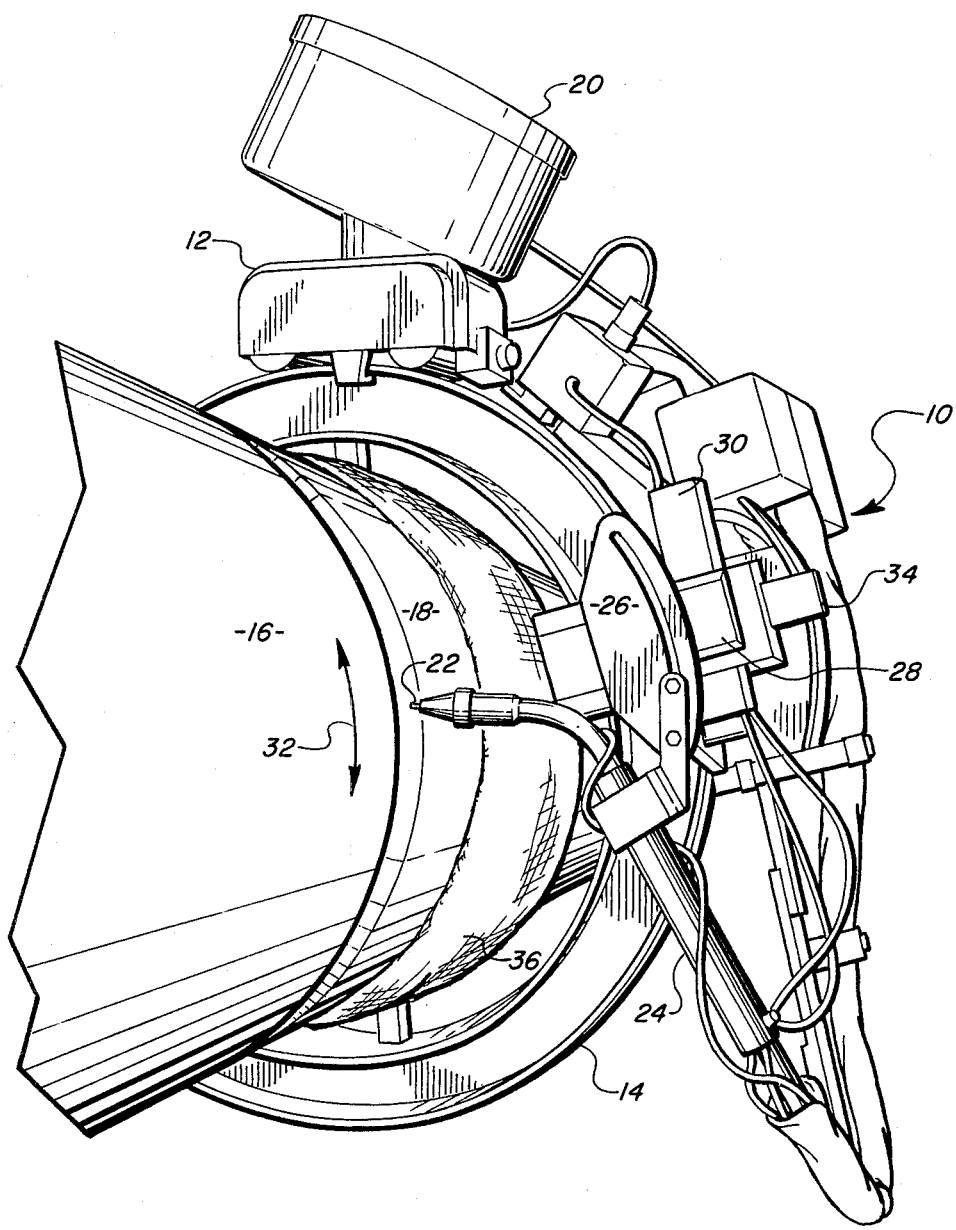
FIG. 3 is a pictorial view of a welding apparatus for practicing the present invention.

Referring now to FIG. 3, therein is a pictorial sketch of a particularly preferred embodiment for use in practicing the present invention, namely, an automatic welder for joining two parts together in which a substantial portion of the welding is accomplished out of position. As used herein, the term out-of-position welding refers to welds in which the electrode is more than 10° out of a vertical down position. The welding apparatus comprises a power supply (not shown) for supplying the welding wave form of the present invention and a self-propelled automatic welding fixture 10. Welding fixture 10 comprises wheeled carriage means 12 for travel along a rail 14 which is mounted about the periphery of the work to be welded.

As depicted in FIG. 3, the work comprises two substantially cylindrical tube members 16 and 18 which have beveled ends which are butted together to form a groove. The two pieces are joined together by filling the groove with weld material. Mounted on carriage means 12 is a supply of consumable electrode wire contained in a drum 20 which is fed to a tip 22 of a weld assembly 24. Weld assembly 24 also includes means (not shown) for discharging a stream of shielding gas circumferentially about tip 22 during the welding process. Weld assembly 24 is attached to a bracket 26 which provides for the adjustment of tip 22 with respect to a perpendicular from the outer surface of members 16 and 18.

Welding fixture 10 also includes a motor driven slide member 28 which provides for movement of weld assembly 24 and bracket 26 in a direction transverse to the groove formed by members 16 and 18. Motor-driven slide member 28 is automatically controlled to oscillate weld tip 22 back and forth across the groove during welding. Welding fixture 10 is provided with another motor-driven slide member 30 which provides for linear oscillation in a direction parallel to the groove to be welded as shown by arrow 32. Welding fixture 10 still further includes yet another motor-driven slide member 34 for movement of welding tip 22 in a direction substantially perpendicular to the surface of members 16 and 18 whereby slide members 28 and 34, acting in cooperation with one another, provide for the movement of tip 22 laterally across the groove formed between members 16 and 18 in such manner that tip 22 follows the contour of the groove at a substantially uniform distance therefrom.

In certain applications, such as to comply with nuclear reactor vessel codes, it is a requirement that the parts being welded be maintained at some substantially elevated minimum temperature to ensure that no undue stresses are introduced into the parts during welding. This frequently is accomplished, as exemplified in FIG. 3, by wrapping the part with a thermally insulated, electrically heated blanket or covering 36. The precise manner in which the motor driven slide members are controlled is well known to those skilled in the art and examples of such control are found in U.S. Pat. Nos. 3,777,115 and 4,019,016.

In operation, an arc is established and maintained between the consumable electrode and the part to be welded. It will be appreciated that welding with a consumable metal electrode is more complicated than welding, for example, with a nonconsumable tungsten electrode. More particularly, in gas tungsten welding with a nonconsumable electrode, the arc length depends upon the distance between the electrode and the work. In a gas metal arc welding system, however, the arc length also depends on the balance between the melt rate and the feed rate of the electrode, assuming, of course, that the electrode-to-work distance remains constant. The arc length in a gas metal arc weld is controlled with one of two methods. In accordance with one method, the melt rate is held constant by using a constant current power supply and the feed rate of the electrode is varied by feeding the electrode faster or slower to make the arc length shorter or longer. This method requires a feed system which can automatically adjust the feed rate to maintain the correct arc length. In this type of method, frequently called a voltage-controlled or on-demand system, the arc length is sensed by measuring the arc voltage; if the arc becomes too long as indicated by increase in voltage, the feed rate is increased. When the arc voltage decreases below a desired level, indicating too short an arc length, the electrode feed rate is decreased.

The preferred method of control, however, is one in which the electrode feed rate is substantially constant and the current is varied. This method of control is called a self-regulating constant potential system. It employs a constant potential power supply whereby a decrease in the arc length will cause the current to increase. This current increase will in turn increase the rate at which the electrode is consumed to regain the desired arc length. An increase in arc length with result in a current decrease. Again, this current decrease will decrease the electrode melting rate to again regain the desired arc length. Thus, this method will automatically increase or decrease the electrode melting rate to maintain the constant arc length (voltage) required, and hence, is a self-regulating system.

It is another feature of the present invention that during welding the arc is oscillated at least transversely to the weld.

In order to overcome the undesirable gravitational effects on the arc puddle, mechanical oscillation of the arc is employed. This feature, used in conjunction with the pulsing technique, permits the depositing of wire at high rates.

An oscillator control section is provided to automatically control position of the torch in accordance with command and feedback signals. Advantageously, there also is provided a position amplifier to amplify difference in the error of the command signal. The amplified differential signal is connected to a velocity servo loop which integrates the difference and drives the oscillator servo motor until the difference is essentially reduced to zero, i.e., the actual position agrees with the command set position.

With these features, oscillation of the weld puddle is readily established. Weld oscillation used in conjunction with arc pulsing enables the rapid deposition of wire introduced into the weld puddle during an out-of-position welding operation. This oscillation feature used in conjunction with the pulsing arc and voltage control wire feed mechanism results in a very stable system which is needed for out-of-position welding.

In order to further increase the deposition rate and therefore increase the manufacturing capability, the technique of oscillating the weld in both the X and Y coordinates can be employed. With the use of two oscillators operating at 90° to each other, X-Y oscillation of the weld puddle is achieved. Vector summation of the oscillators permits generation of square wave, circular weld, etc. patterns which in turn increases the desired weld decomposition rate. This effectively permits the weld puddle to partially solidify as the welding pattern is generated.

Advantageously, provisions also are made for a momentary dwell at either side of the center of the weld when the arc is oscillated transversely. It has been found that if during this dwell period the power input to the arc is momentarily increased by from about 1 to 25%, then the quality of the weld is substantially improved. Specifically, a momentary increase in voltage or current and preferably from about 1 to 10% to obtain such power increase provides deeper penetration at each end or on each side of the weld and assures sidewall and interbead fusion.

An apparatus substantially as depicted in FIG. 3 was used to join two metal parts together. The two parts comprised substantially cylindrical vessels having a diameter of 4.5 feet and wall thicknesses of about 5 inches. The consumable electrode comprised wire having a composition of $2\frac{1}{4}$ Cr-1 Mo and a diameter of 0.035 inches. The shielding gas comprised 61% He 35% Ar 4% $CO_2$. The welding supply utilized was a prior art type which supplied direct current to the electrode at a pulse rate of about 20 pulses per second. The parts to be joined together were maintained at a temperature of about 500° F. during the welding process since these welds were required to meet the nuclear code for pressure vessels. The highest weld rate obtainable was about 2.8 pounds per hour. Thus, in accordance with the prior art technique, approximately 400 passes and 130 arc-hours were required to join the two sections.

The foregoing procedure was repeated except for replacing the power supply with one which had been modified to provide the wave form of the present invention. The same electrode material pulsed between a first direct current of about 50 amps to a first maximum amplitude of about 130 amps (about 100% of the minimum current required to produce a spray transfer of metal) and pulsed between these two amplitudes at a frequency of about 16,000 pulses per second. The first maximum amplitude was cyclically increased at a frequency of about 150 cycles per second to a second maximum amplitude of 400 amps (about 300% of the minimum current required to produce a spray transfer of metal) and maintained at the second amplitude for a time of about 18% of each cycle with all other variables remaining substantially the same. This time it was possible to produce high quality welds with a deposition rate of about 5.8 pounds per hour, thus reducing the required number of arc-hours to 59.

It further has been found that the use of flux cored wire further increases deposition rates to levels exceeding 10 pounds per hour. These high deposition rates were obtained when welding out of position by the use of a combination of flux cored wire (0.045 inches in diameter) used in conjunction with X-Y oscillation of the arc.

Mechanically oscillating the arc in the weld groove permits rapid chilling of the weld puddle. Weld puddle freezing achieved with the pulsing technique combined with the use of the large-diameter flux cored wire results in a further advancement in out-of-position gas metal arc welding.

What is claimed is:
1. A gas-shielded metal-arc welding process comprising:
   (a) applying a sufficient voltage to a consumable metal electrode to establish an arc in a gas shielded environment;
   (b) supplying a direct current of about 15 to 80 amps to said electrode and pulsing said direct current at a frequency of from about 5000 to 25,000 pulses per second to a first maximum amplitude of from about 100 to 125% of the minimum current required to produce a spray transfer of metal from said electrode;
   (c) cyclically increasing the first maximum amplitude of said pulsating direct current at a frequency of from about 90 to 400 cycles per second to a second maximum amplitude of from about 150 to 600% of the minimum current required for spray transfer of metal and maintaining said second amplitude for a time of from about 5 to 50% of each cycle.

2. The method of claim 1 wherein said direct current is pulsed at a frequency of from about 10,000 to 20,000 pulses per second.

3. The process of claim 1 wherein said first maximum amplitude of said pulsating current is increased to said second maximum amplitude at a frequency of from about 100 to 175 cycles per second.

4. The method of claim 1 wherein said electrode is shielded in a gaseous mixture comprising argon, helium and carbon dioxide.

5. The process of claim 1 wherein said shield gas comprises about 60% helium, about 25% argon and the balance consists essentially of carbon dioxide.

6. The process of claim 1 further comprising automatically feeding said metal electrode into said arc at a controllable rate, automatically moving said electrode in a linear direction and oscillating said arc laterally of said linear direction.

7. The process of claim 6 further including periodically increasing said power input to the arc at a predetermined point in the lateral movement of said arc.

8. The process of claim 7 further including oscillating said arc in said linear direction.

9. The process of claim 8 wherein said welding is out-of-position welding.

10. The process of claim 9 wherein said consumable metal electrode includes a flux.

11. The process of claim 9 wherein said electrode is shielded in a gaseous mixture comprising argon, helium and carbon dioxide.

* * * * *